G. D. PARKER.
GRAVITY FRUIT SEPARATOR.
APPLICATION FILED APR. 26, 1913.
1,186,677.
Patented June 13, 1916.
2 SHEETS—SHEET 2.
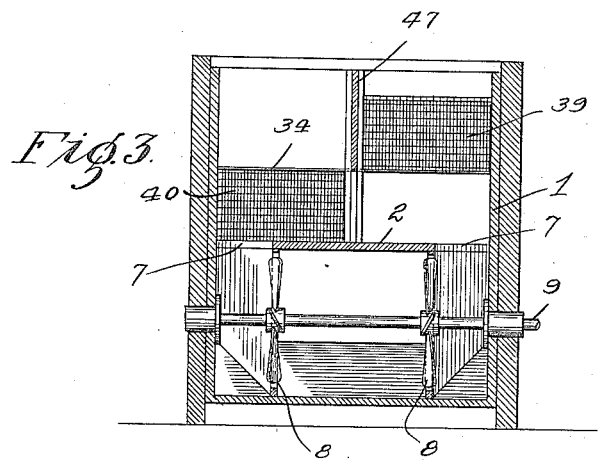
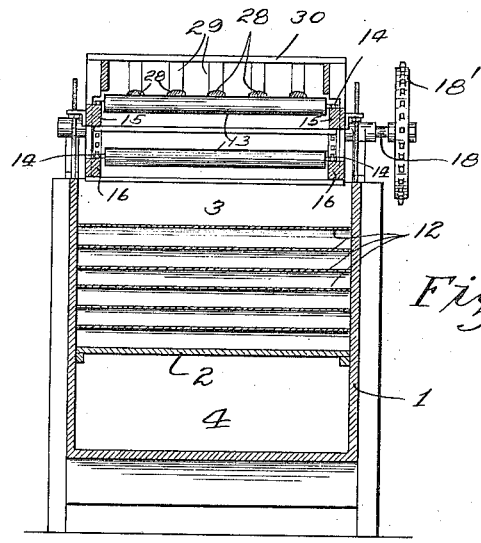
WITNESSES:
W. G. Stock
Harry A. Totten
INVENTOR
Geo. D. Parker
BY
his ATTORNEY

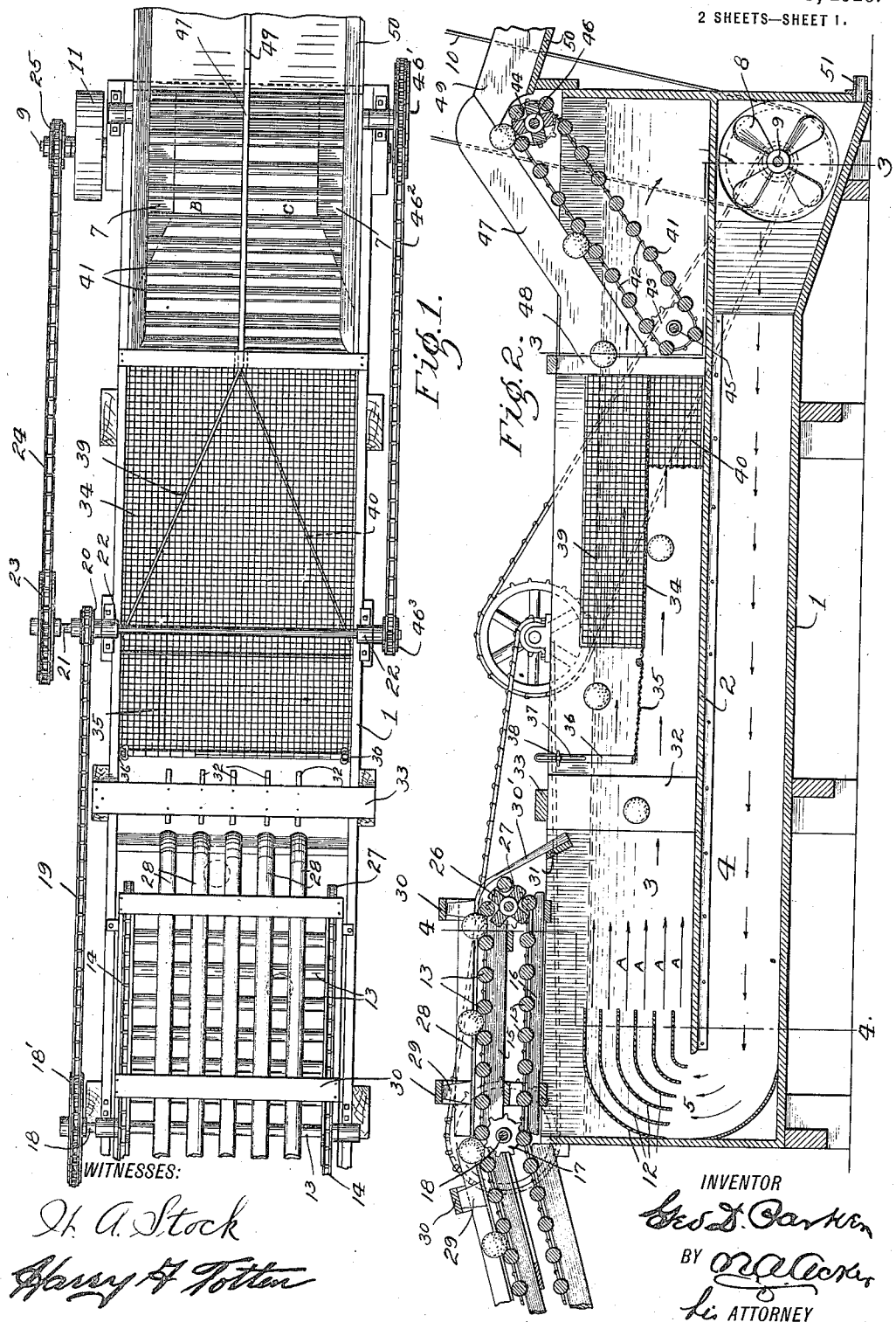

UNITED STATES PATENT OFFICE.

GEORGE D. PARKER, OF RIVERSIDE, CALIFORNIA.

GRAVITY FRUIT-SEPARATOR.

1,186,677.  Specification of Letters Patent.  Patented June 13, 1916.

Application filed April 26, 1913. Serial No. 763,764.

*To all whom it may concern:*

Be it known that I, GEORGE D. PARKER, a citizen of the United States, residing at Riverside, in the county of Riverside and State of California, have invented certain new and useful Improvements in Gravity Fruit-Separators, of which the following is a specification.

The hereinafter described invention relates to improvements in fruit treating or separating apparatus, and more particularly to a type of apparatus designed for separating frozen or more commonly termed frost-bitten fruit from that which has not been frost-bitten or frozen, and the invention has for its principal objects to provide an apparatus employing a flowing stream of fluid, in which the fruit when dropped, will, in accordance with its difference in weight dip deep thereinto or remain near the surface thereof, the fruit dipping beyond a certain depth into the fluid being carried by the flow of the fluid to one discharge channel, and the remaining fruit being carried to one or more other channels; to provide an apparatus which is capable of handling a quantity of fruit at one time, and one provided with adjustable means for adapting the apparatus for the treatment of fruit of different sizes.

With the above mentioned and other objects in view, the invention consists in the novel construction and combination of parts hereinafter described, illustrated in the accompanying drawings, and pointed out in the claims hereto appended; it being understood that various changes in the form, proportion, size and minor details of construction within the scope of the claims may be resorted to without departing from the spirit or sacrificing any advantages of the invention.

To more fully comprehend the invention reference should be had to the accompanying sheets of drawings, disclosing one form of my invention, and in which, Figure 1 is a top plan view of my improved apparatus, disclosing the fruit feeding and removing conveyers and the arrangement of the separating channels. Fig. 2 is a longitudinal central sectional view of Fig. 1, disclosing the fruit feeding and removing conveyers, the water circulating passage, the separating channels, and the adjustable directing section associated with the receiving end thereof. Fig. 3 is a sectional view taken on line 3—3 of Fig. 2, disclosing the separating channels and the fluid circulating means. Fig. 4 is a sectional view taken on line 4—4 of Fig. 2, disclosing the fluid directing vanes.

Referring more particularly to the drawings, wherein like reference numerals designate corresponding parts throughout the several views, the numeral 1 indicates a suitable open topped receptacle for containing a suitable fluid, such as water, and extending longitudinally of the receptacle is a transversely disposed wall 2 which divides the receptacle into upper and lower compartments or passages 3 and 4 which are connected at one end by the passage 5 and at their opposite end through passages 7 formed in the wall 2 adjacent the side edges thereof. The fluid is maintained in circulation from one compartment to the other, in the direction as indicated by the arrows— Fig. 2, by the agitating blades or wheels 8, positioned adjacent the openings 7, and carried by a shaft 9 rotatably mounted in journals in the sides of the receptacle 1, and said shaft receives its power preferably through a belt 10 which operates on a pulley 11 keyed to said shaft. The directing vanes 12 extending transversely of the upper compartment 3 immediately above the opening of passage 5 and secured preferably to the sides of the receptacle 1, prevent the fluid from swirling as the same is forced from the lower to the upper compartment, and directs the same in a horizontal path, as indicated by the arrows A of Fig. 2.

The fruit to be treated is conveyed into the receptacle in any suitable manner, preferably by an endless conveyer, composed of the spaced transversely disposed rolls 13 carried by the chains 14, and which operate on the upper and lower tracks 15 and 16, the ends of which project over the receptacle 1 a slight distance beyond the vanes 12. The chains are driven by the sprockets 17, carried by the rotatable shaft 18, journaled in bearings supported on the end of the receptacle 1, and said shaft carries on its end a sprocket 18′ driven by a chain 19 which extends around a small sprocket 20 carried by a counter shaft 21 journaled in bearings 22 secured to the upper end of the receptacle, and said shaft carries a suitable sprocket 23 which is in geared relation through the chain 24 with a sprocket 25 carried by the shaft 9. A rotatable longitudinally grooved supporting roll 26, provided on its opposite ends with sprockets 27 over which the chains 14 operate, supports the rolls 13 at the discharge end of the supporting tracks 15 and 16.

The fruit when positioned on the rolls is guided to the discharge end of the conveyer between the stationary parallel spaced guides 28, which extend the full length of the conveyer and are supported by the division members 29 carried by the supporting frames 30, positioned above the tracks 15 and 16 and secured thereto as in Fig. 4. The discharge ends of the guides 28 extend over the roll 26 and project downwardly in an inclined direction, as at 30', a short distance into the receptacle 1 where they are secured to a transverse support 31 secured to the sides of the receptacle adjacent the top edge thereof.

The fruit on leaving the ends of the guides 28 and dropping into the fluid passes between other vertically extending spaced guides 32, positioned in the upper compartment 3 and retained in position by the member 33. Positioned in the compartment 3 in rear of the spaced guides 32 is the means for separating the fruit, and the same is constructed preferably of screen material and comprises a transversely disposed dividing section 34 extending across the interior of the receptacle above the wall 2 and supported at the sides thereof in any suitable manner, and is formed at its front edge with a similarly disposed adjustable section 35, hinged at its rear edge to the front edge of the section 34, and carrying at its front edge the adjusting members 36, slotted as at 37 and through which slots project the adjusting and retaining means 38 in the form of a nut and bolt, secured in the opposite interior side walls of the receptacle 1 adjacent the top edge thereof. The adjustable section is raised or lowered dependent upon the depth of submergence of the fruit to be separated. Projecting upwardly from the upper surface of the section 34 and extending angularly from one forward side edge thereof rearwardly to approximately the center of the rear edge thereof, is a directing section or partition 39, which directs that portion of the fruit which passes above the adjustable section 35 onto a discharge conveyer as hereinafter described. A directing section or partition 40 is positioned between the underside of the dividing section 34 and the partition 2, and the same extends from the front edge of the section rearwardly to a point below the rear end of the section 39, and conveys that portion of the fruit that passes below the adjustable section 35 on to a discharge conveyer.

The discharge conveyer comprises spaced rolls 41 connected at their opposite ends by the parallel spaced endless chains 42 operating over sprockets 43 and 44, arranged in pairs on the respective rotatably mounted transversely extending shafts 45 and 46, each operating in suitable bearings carried by the side walls of the receptacle 1, the shaft 45 being positioned immediately above the partition 2 and in rear of the rear edge of the dividing section 34, and the shaft 46 being positioned adjacent the upper rear edge of the receptacle, thus providing an upwardly inclined endless conveyer for removing the separated fruit from within the fluid. The conveyer is operated through a sprocket 46' carried by the shaft 46 which is in geared relation through the chain $46^2$ with a sprocket $46^3$ carried by the counter shaft 21.

A dividing wall 47 extends the full length of the conveyer as in Figs. 1 and 2, and at its lower end is supported by the frame 48 and is connected to the rear end of the directing section or partition 39, the upper end of the dividing wall is connected to a similar wall 49, extending longitudinally of a suitable discharge chute 50 positioned in operative relation with the upper end of the endless conveyer and extending to any suitable place of deposit. A suitable outlet 51 is provided for drawing the fluid from the receptacle when desired.

From the above construction, it will be apparent that the fruit passing beneath the dividing section 34 will be guided by the directing section or partition 40 onto the portion B of the endless discharge conveyer, and the fruit passing above the dividing section 35 will be guided by the directing section 39 onto the portion C of the endless discharge conveyer.

Assuming the receptacle 1 to be filled with fluid, preferably water, to a height as in Fig. 2 of the drawings, the adjustable section 35 is properly positioned and power is applied to the belt 10 to drive the same in the direction of the arrow, the apparatus operates in the following manner.

The fruit to be separated is deposited onto the endless feeding conveyer, and is carried by the rolls 13 between the guides 28 to the discharge end thereof where it rolls by gravity between the inclined portions 30' thereof, and is deposited between the guides 32 into the fluid which is moving in the direction of the arrows—Fig. 2 of the drawings. The good fruit or that which is not frozen or frost-bitten, owing to its greater weight than the frost-bitten or frozen fruit, will dip deep into the fluid and will be carried by the flow of the fluid beneath the forward edge of the adjustable section 35 before it completes its upward movement to the surface of the fluid and will pass beneath the dividing section 34 and be guided by the directing section 40 onto the portion B of the discharge conveyer which elevates the sorted or separated fruit from the fluid, and discharges the same into the discharge chute 50. The frozen or frost-bitten fruit owing to its light weight, will, on being dropped into the fluid from the same height as the good fruit, only sink or dip a short distance thereinto and will have in its upward movement cleared the forward edge of the adjustable section 35 before being carried thereunder by the flow of the fluid, and the said frost-bitten or frozen fruit will pass above the dividing section 34, and be guided by the guiding section 39 onto the portion C of the discharge conveyer, which elevates the sorted fruit as herebefore described.

It is apparent that the fluid is maintained in constant circulation in the direction of the arrows by the fans or blades 8 and that the fluid when passing through the opening 5 into compartment 3 is prevented from swirling and is directed rearwardly into the compartment by the directing vanes or blades 12.

The apparatus as above described is capable of separating various sizes of frozen and non-frozen fruit from each other, is automatic in all of its operations, is simple in construction, and is thoroughly efficient for the purposes designed.

Having thus described my invention what is claimed as new and is desired to be protected by Letters Patent is:—

1. A fruit separator including a fluid tank provided with a longitudinally disposed partitioning member which divides the tank into upper and lower chambers communicating at the ends of the tank, means for producing a continuous circulation of fluid through the tank, means for introducing fruit at one end of the tank, means dividing the upper compartment into longitudinal parallel ways, and a conveyer receiving fruit from each of said ways.

2. A fruit separator including a fluid tank provided with a longitudinally disposed partitioning member dividing the tank into upper and lower compartments which communicate at the ends of the tank, means for producing a continuous circulation of fluid through the tank, means for introducing fruit at one end of the tank and directing the same downwardly toward the other end of the tank, means dividing the upper compartments into longitudinal parallel ways arranged in superposed relation, said ways diverging at their ends remote from the receiving end of the tank, and a conveyer receiving the fruit from each of said ways.

3. A fruit separator including a fluid tank, said tank being divided into upper and lower compartments, superposed ways arranged in the upper compartment and formed of horizontally and vertically disposed sheets of foraminous material, means for causing a continuous circulation of fluid through the compartments and said ways, means for delivering the fruit to the upper compartment and a conveyer receiving the fruit from each of said ways.

4. In an apparatus of the character described, a fluid tank associated with means for causing movement of fluid in the tank, in combination with deflectors disposed in superposed relation in the path of movement of the fluid adapted at one end to receive the fluid and at the opposite end to direct the fluid in a straight line through the tank.

5. A fluid separator including a fluid tank, said tank being divided into upper and lower compartments, means for delivering fruit to the upper compartments at one end of the tank, means for forcing the fluid through the lower compartment toward the receiving end of the tank, deflectors disposed in superposed relation and receiving the fluid from the lower compartment and directing the same in a straight line through the upper compartment, ways arranged in different planes and in parallel relation within the upper chamber, the entrance to each of the ways extending entirely across the upper chamber and conveyers receiving the fruit which is conducted through the ways by the fluid.

6. A fruit separator including a fluid tank divided into upper and lower compartments, means arranged in the lower tank for causing a continuous circulation of the fluid longitudinally of the tank through both of the compartments, means for delivering fruit at one end of the tank, fruit receiving means at the other end of the tank, a partitioning member dividing the upper compartment into a plurality of longitudinally disposed ways throughout a portion of the length of the tank, said ways being disposed in different planes and provided with receiving mouths which extend entirely across the tank.

7. A fruit separator including a fluid tank divided into upper and lower compartments, means arranged in the lower tank for causing a continuous circulation of the fluid longitudinally of the tank through both of the compartments, means for delivering fruit at one end of the tank, fruit receiving means at the other end of the tank, a partitioning member dividing the upper compartment into a plurality of longitudinally disposed ways throughout a portion of the length of the tank, said ways being disposed in different planes and provided with receiving mouths which extend entirely across the tank, and a longitudinally disposed partitioning member adjustably supported in alinement with the upper wall of the lower way and the lower wall of the upper way whereby to alternately increase or diminish the size of the mouths of the ways.

8. A fruit separator including a tank divided into upper and lower compartments, means for supplying fruit to the tank at one of its ends, said means including guide fingers spaced transversely of the tank and provided with downwardly curved extensions, means for causing a continuous circulation of fluid through the compartments, superposed ways arranged in the upper compartment and conveyers receiving the fruit from each of said ways.

9. An apparatus for the treatment of fruit for separating the same in accordance with a difference in weight, the same comprising a receptacle for containing a flowing fluid and into which the fruit to be treated is submerged, the receptacle being provided with a plurality of open ended channels disposed in different horizontal planes and through which the fruit is carried by the flowing fluid body in accordance with the depth of submergence of the fruit in the fluid, and means for varying the position of the receiving ends of said channels relative to said receptacle.

10. An apparatus for the treatment of fruit for separating the same in accordance with a difference in weight, the same comprising a receptacle for containing a flowing fluid and into which the fruit to be treated is submerged, the receptacle being provided with a plurality of open ended channels disposed in different horizontal planes and through which the fruit is carried by the flowing fluid body in accordance with the depth of submergence of the fruit in the fluid, means for varying the position of the receiving ends of said channels relative to said receptacle, and means for receiving the separated fruit from the discharge ends of said channels and for removing the same from the receptacle.

11. An apparatus for the treatment of fruit for separating the same in accordance with a difference in weight, the same comprising a receptacle adapted to contain a fluid into which the fruit to be treated is submerged, there being a plurality of fluid circulating passages in said receptacle, means for maintaining the fluid in circulation from one passage to another, there being a plurality of open ended channels located within one of said passages in said receptacle in different horizontal planes and through which the fruit is carried by the flowing fluid body in accordance with the depth of submergence of the fruit within the fluid, and means for varying the position of the receiving ends of said channels in said receptacle.

12. An apparatus for the treatment of fruit for separating the same in accordance with a difference in weight, the same comprising a receptacle adapted to contain a fluid into which the fruit to be treated is submerged, there being a plurality of fluid circulating passages in said receptacle, means for maintaining the fluid in circulation from one passage to another, there being a plurality of open ended channels located within one of said passages in said receptacle in different horizontal planes and through which the fruit is carried by the flowing fluid body in accordance with the depth of submergence of the fruit within the fluid, means for varying the position of the receiving ends of said channels in said receptacle, and means for receiving the separated fruit from the discharge ends of said channels and for removing the same from the receptacle.

13. An apparatus for the treatment of fruit for separating the same in accordance with a difference in weight, the same comprising a receptacle for containing a fluid into which the fruit to be treated is submerged, means for feeding the fruit to be treated into said receptacle, there being a plurality of fluid circulating passages in said receptacle, means for maintaining the fluid in circulation from one passage to another, there being a plurality of open ended channels located within one of said passages in said receptacle in different horizontal planes and through which the fruit is carried by the flowing fluid body in accordance with the depth of submergence of the fruit within the fluid, means for varying the position of the receiving ends of said channels in said receptacle, and a conveyer common to the discharge ends of all of said channels for receiving the separated fruit and removing the same in a separated condition from the receptacle.

In testimony whereof I have signed my name to this specification in the presence of two subscribing witnesses.

GEORGE D. PARKER

Witnesses:
 N. A. ACKER,
 D. B. RICHARDS.